United States Patent
Fahldieck (10) Patent No.: US 9,415,951 B2
(45) Date of Patent: Aug. 16, 2016

(54) CONTAINER-HANDLING OR GRIPPER ARRANGEMENT

(71) Applicant: Andreas Fahldieck, Idar-Oberstein (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/562,899

(22) Filed: Dec. 8, 2014

(65) Prior Publication Data

US 2015/0091316 A1 Apr. 2, 2015

Related U.S. Application Data

(63) Continuation-in-part of application No. PCT/EP2013/001534, filed on May 24, 2013.

(30) Foreign Application Priority Data

Jun. 11, 2012 (DE) .......................... 10 2012 011 367

(51) Int. Cl.
*B25J 15/02* (2006.01)
*B65G 47/86* (2006.01)
*B08B 9/42* (2006.01)

(52) U.S. Cl.
CPC ............... *B65G 47/847* (2013.01); *B08B 9/426* (2013.01); *B65G 2201/0244* (2013.01)

(58) Field of Classification Search
CPC ..................... B65G 47/847; B65G 2201/0244; B65G 2201/0247; B08B 9/426; B67C 7/004; B25J 15/0025; B25J 15/0226
USPC ............... 294/116, 99.1, 203; 198/777, 803.9
See application file for complete search history.

(56) References Cited

U.S. PATENT DOCUMENTS

| | | | | | |
|---|---|---|---|---|---|
| 2,061,083 | A | * | 11/1936 | Niemi | B66D 3/04 292/27 |
| 3,975,260 | A | * | 8/1976 | Peyton | B07C 5/122 198/441 |
| 4,169,621 | A | * | 10/1979 | McGill | B65B 21/12 294/116 |
| 6,612,634 | B1 | * | 9/2003 | Zoppas | B25J 15/0206 294/106 |
| 7,988,400 | B2 | * | 8/2011 | Yuyama | B25J 15/0226 221/265 |

(Continued)

FOREIGN PATENT DOCUMENTS

| | | | |
|---|---|---|---|
| DE | 29712066 U1 * | 10/1997 | ........... B25J 15/0206 |
| EP | 0577569 | 1/1994 | |

(Continued)

OTHER PUBLICATIONS

German Office Action 10 2012 011 367.6, dated May 14, 2014, and English translation thereof.

(Continued)

*Primary Examiner* — Gabriela Puig
(74) *Attorney, Agent, or Firm* — Nils H. Ljungman & Associates (57) ABSTRACT

A container-handling arrangement has a gripper that includes two gripper arms. The container-handling arrangement further has a biasing device that is used to bias the gripper arms together to hold a portion of a container therebetween. The container-handling arrangement also has a locking element that is designed to be moved between a lock position, in which the locking element locks the gripper arms in place to prevent release of the container, and a release position, in which the locking element does not engage the gripper arms to permit release of the container.

20 Claims, 5 Drawing Sheets

(56) References Cited

U.S. PATENT DOCUMENTS

| | | | | |
|---|---|---|---|---|
| 8,602,471 | B2* | 12/2013 | Bodtlander | B65G 47/847 198/803.6 |
| 8,672,376 | B1* | 3/2014 | Wilson | B25J 15/0028 294/116 |
| 8,833,824 | B2* | 9/2014 | Fahldieck | B65G 47/847 198/468.5 |
| 8,894,114 | B2* | 11/2014 | Fahldieck | B65G 47/847 198/407 |
| 2009/0014284 | A1* | 1/2009 | Langlois | B29C 49/421 198/803.9 |
| 2010/0133067 | A1* | 6/2010 | Martinelli | B65G 47/847 198/470.1 |
| 2011/0308666 | A1* | 12/2011 | Bodtlander | B67C 3/242 141/165 |
| 2012/0031043 | A1 | 2/2012 | Yuyama et al. | |
| 2012/0241407 | A1* | 9/2012 | Fahldieck | B65G 47/847 215/386 |
| 2013/0274913 | A1* | 10/2013 | Wilson | B65G 1/0478 700/214 |
| 2014/0008927 | A1* | 1/2014 | Rousseau | B29C 49/4205 294/90 |
| 2014/0238825 | A1* | 8/2014 | Schulnig | B65G 47/847 198/570 |

FOREIGN PATENT DOCUMENTS

| | | |
|---|---|---|
| EP | 1854589 | 11/2007 |
| WO | WO 2009/135596 | 5/2008 |

OTHER PUBLICATIONS

International Preliminary Report on Patentability, dated Dec. 24, 2014, and English translation thereof.

* cited by examiner

CONTAINER-HANDLING OR GRIPPER ARRANGEMENT

CONTINUING APPLICATION DATA

This application is a Continuation-In-Part application of International Patent Application No. PCT/2013/001534, filed on May 24, 2013, which claims priority from Federal Republic of Germany Patent Application No. 10 2012 011 367.6, filed on Jun. 11, 2012. International Patent Application No. PCT/2013/001534 was pending as of the filing date of this application. The United States was an elected state in International Patent Application No. PCT/2013/001534.

BACKGROUND

1. Technical Field

The present application relates to a container-handling or gripper arrangement and to a transport element.

2. Background Information

Background information is for informational purposes only and does not necessarily admit that subsequently mentioned information and publications are prior art.

Gripper arrangements with grippers for holding bottles or similar containers on rotary transport elements, for example of container handling machines or transport star wheels, are known, also as passive grippers, i.e. tong-like grippers which hold the respective container clamped by spring force between gripper arms, and in which the transfer or pushing-in and withdrawal of the respective container into and out of the gripper is effected by opening the gripper arms against spring force.

A problem with known passive grippers is that a compromise must or should be found between a highest possible clamping or holding force and a softest possible pushing-in and withdrawal of the containers respectively into and out of the grippers, i.e. the pushing-in and withdrawal must or should be effected with the application of a force by the gripper arms on the containers which causes the least possible wear, which basically means limiting the grippers' holding or clamping force.

Object or Objects

An object of the present application is to provide a gripper arrangement which essentially guarantees or promotes an improved hold of the containers at the respective gripper, but while retaining a constructional configuration of the respective gripper which has already demonstrated its worth in practice.

SUMMARY

A gripper arrangements according to the present application is configured to achieve this object. A container transport element is the subject matter of the present application.

For the purpose of the present application the expressions "essentially", "in essence" or "around" mean variations from the respective exact value by +/−10%, possibly by +/−5% and/or variations in the form of changes insignificant for the function.

Further embodiments and possible applications of the present application arise out of the following description of embodiments and out of the figures. All or substantially all or most or some of the described and/or pictorially represented attributes whether alone or in any desired combination are fundamentally the subject matter of the present application independently of their synopsis in the present application or a retroactive application thereof. The content of the present application is also made an integral part of the description.

The core of the present application comprises the fact that a closing or locking element can be controlled to move linearly and radially between a closed position (with the gripper arm or arms in locked position) and an opening or release position (with the gripper arm or arms released for opening). To this end, the locking element is mounted so that it can move and be moved back and forth, i.e. radially outward or radially inward. The closing or locking element exhibits at least one locking face with which, in the position in which the gripper is locked, the control face of one or both gripper arms are arrested.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is explained in detail below through the use of an embodiment example with reference to the figures. In the Figures.

DESCRIPTION OF EMBODIMENT OR EMBODIMENTS

Figure 1:
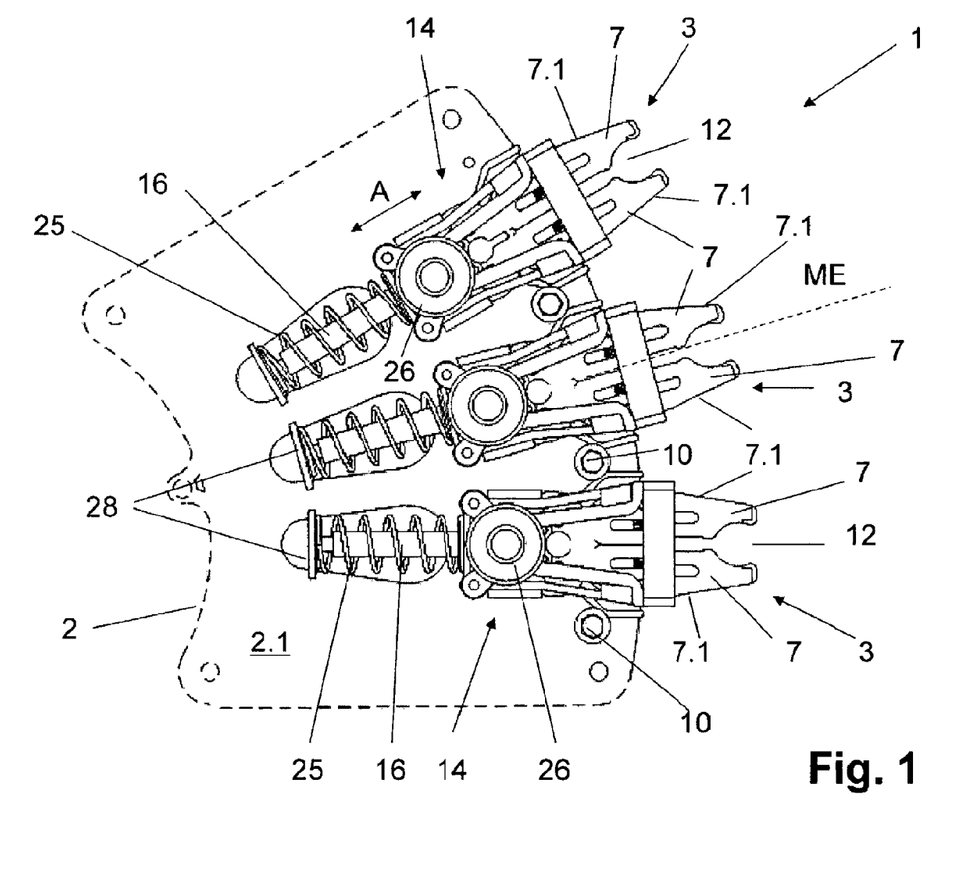
FIGS. 1 and 2 each show a simplified representation and plan view of a gripper arrangement having three grippers in two different operating states of the grippers.

FIG. 1 shows a gripper arrangement which in the depicted embodiment comprises a carrier and/or mounting element in the form of a carrier and/or mounting plate 2 as well as of a group of three tong-like passive grippers 3. When in use or in the assembled condition, gripper arrangement 1 together with a plurality of other gripper arrangements is provided on the periphery of a circulating transport element, for example on the periphery of a star-like or rotor-like transport element 4 which can be driven to rotate about a vertical machine axis MA and which forms part of container handling device 5 for bottles or similar containers 6, e.g. on the rotor of a container filling machine etc. or on a transport star wheel for containers 6. In the depicted embodiment these latter are bottles, in one possible embodiment polyethylene terephthalate (PET) bottles.

Figure 3:
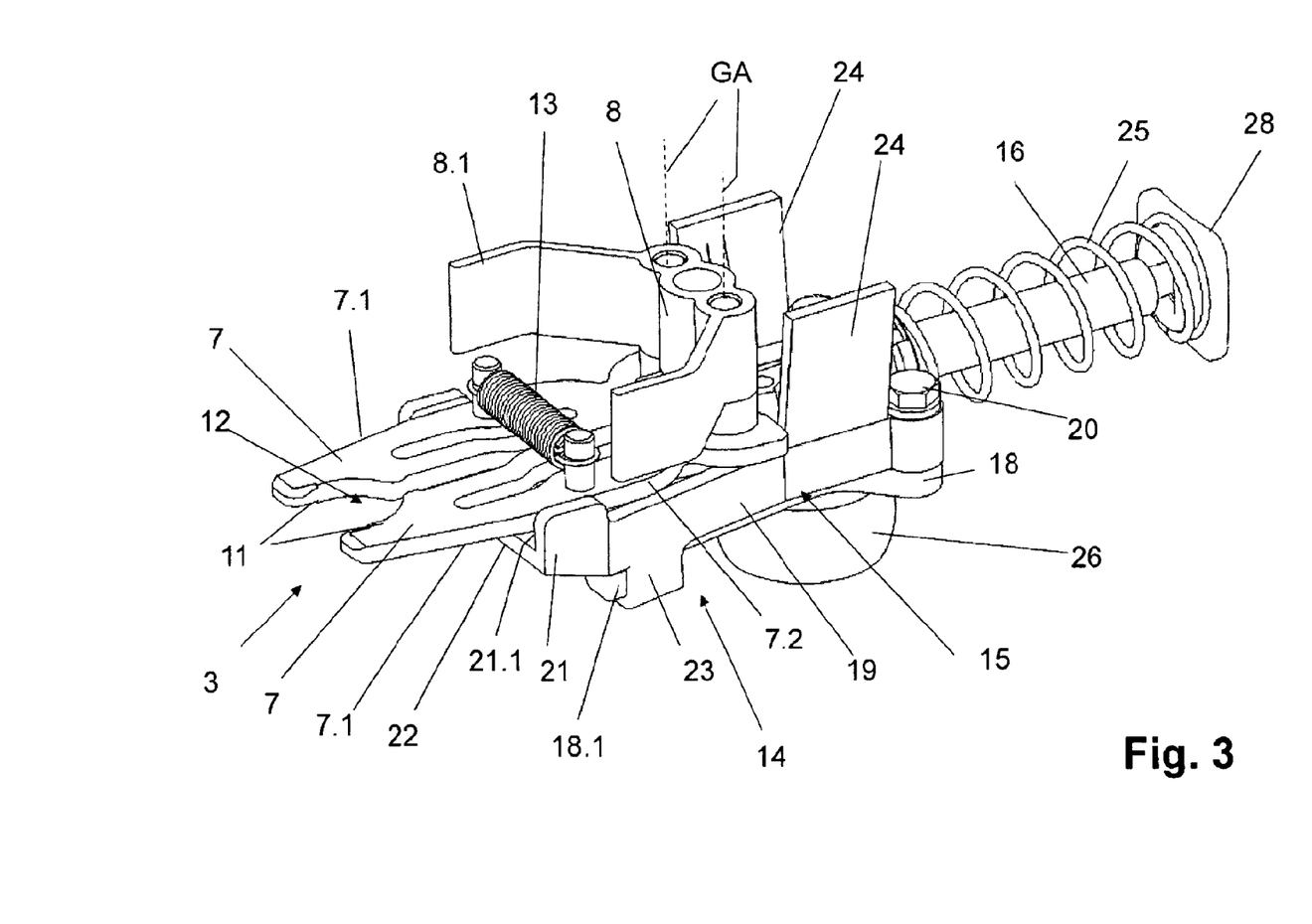
FIG. 3 shows a perspective single representation of one of the grippers of the gripper arrangement of FIGS. 1 and 2, in its mounting position rotated compared with FIGS. 1 and 2.

Each gripper 3 comprises in the depicted embodiment two gripper elements or gripper arms 7 each produced by being cut out from a flat material, e.g. a corrosion resistant steel plate. At one of their ends the two gripper arms 7 of each gripper 3 are mounted on a bearing element 8 by way of a swivel pin so as to be able to swivel about gripper element axes GA. When in the assembled condition, the two gripper axes GA of each gripper 3 are offset relative to each other in the peripheral direction of rotor 4 and arranged at the same or essentially the same radial distance from the machine axis and parallel or essentially parallel to the latter. Axes GA are also oriented at right angles to the surface sides of flat gripper elements 7 and at right angles to the surface sides of carrier and/or mounting plate 2.

The gripper arms 7 have the same shape, with on each gripper 3 one gripper arm 7 being mounted turned opposite to the other gripper arm 7 such that, in regard to their shape and position, in one possible embodiment also in regard to the position of axes GA, the two gripper arms 7 of each gripper 3 are configured mirror-symmetrically to a midplane or plane of symmetry ME oriented parallel or essentially parallel to axes GA and at right angles to the surface sides of carrier and/or mounting plate 2 which when in use, i.e. when gripper arrangement 1 is mounted on transport element 4, is oriented radially or essentially radially to machine axis MA.

Figure 4:
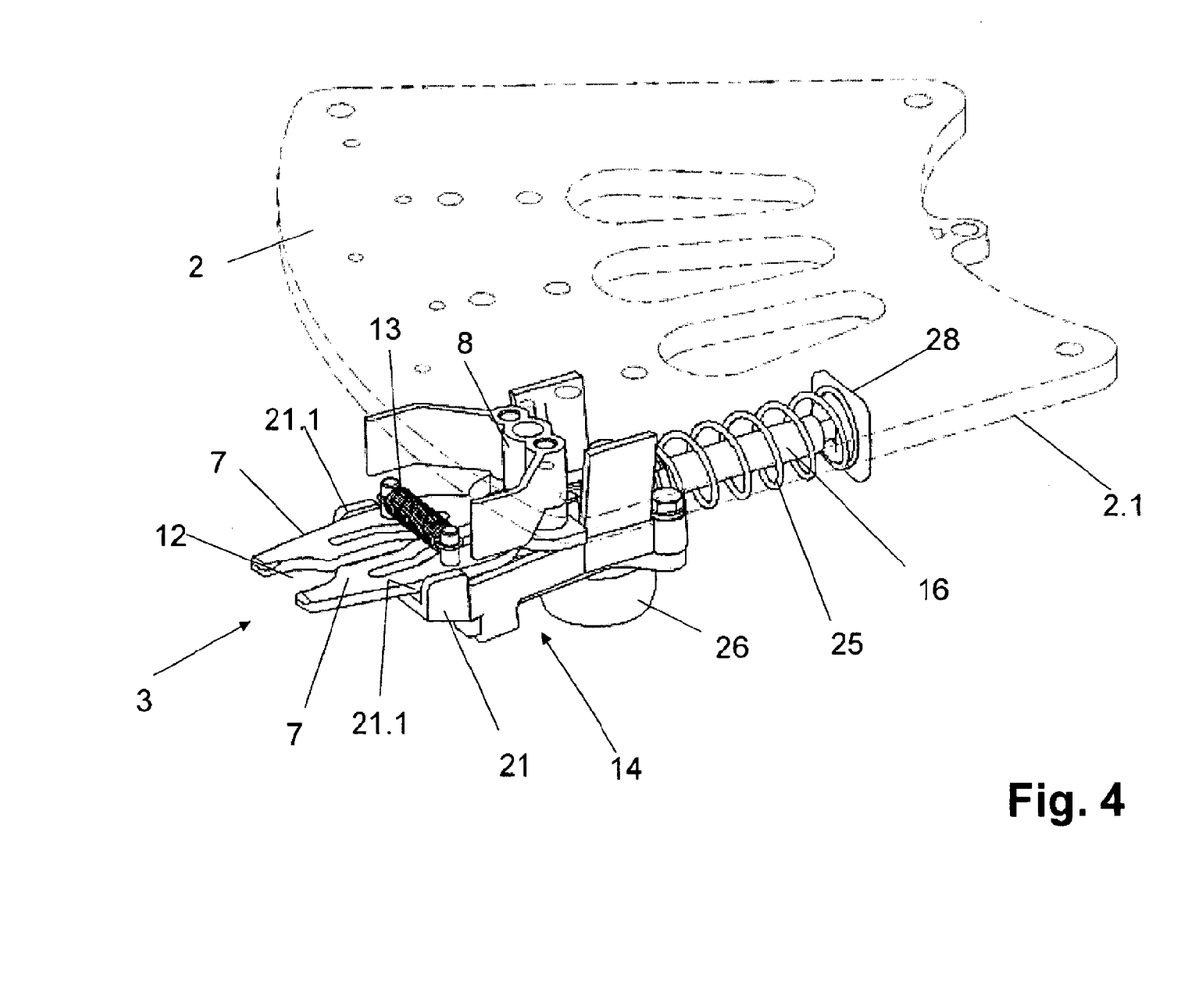
FIG. 4 shows one of the grippers of the gripper arrangement of FIGS. 1 and 2 in its mounting position together with a carrier or mounting element of the gripper arrangement of FIG. 1.

Bearing element 8 is mounted on carrier and/or mounting plate 2 by way of a bearing pin 9 which is oriented with its axis at right angles to the surface side of carrier and/or mounting plate 2 and which projects beyond a surface side 2.1, and in such a way that the axis of bearing pin 9 lies in midplane ME.

Bearing element 8 is also configured with two projecting, in one possible embodiment elastic wings 8.1 which, with their outer faces facing away from each other, each lie against a pin 10 that projects beyond that surface side of carrier and/or mounting plate 2 on which (surface side) the three grippers 3 are also provided. Pins 10 possess the same radial distance away from machine axis MA and are each provided spaced at equal angular distances about machine axis MA. Pins 10 are at a greater radial distance from machine axis MA than bearing pins 9, such that wings 8.1 which lie against pins 10 and bearing pins 9 produce a definite orientation of grippers 3, including in relation to machine axis MA. The two gripper arms 7 are arranged with their surface sides parallel or essentially parallel and at the same distance away from surface side 2.1 of carrier and/or mounting plate 2.

Figure 5:
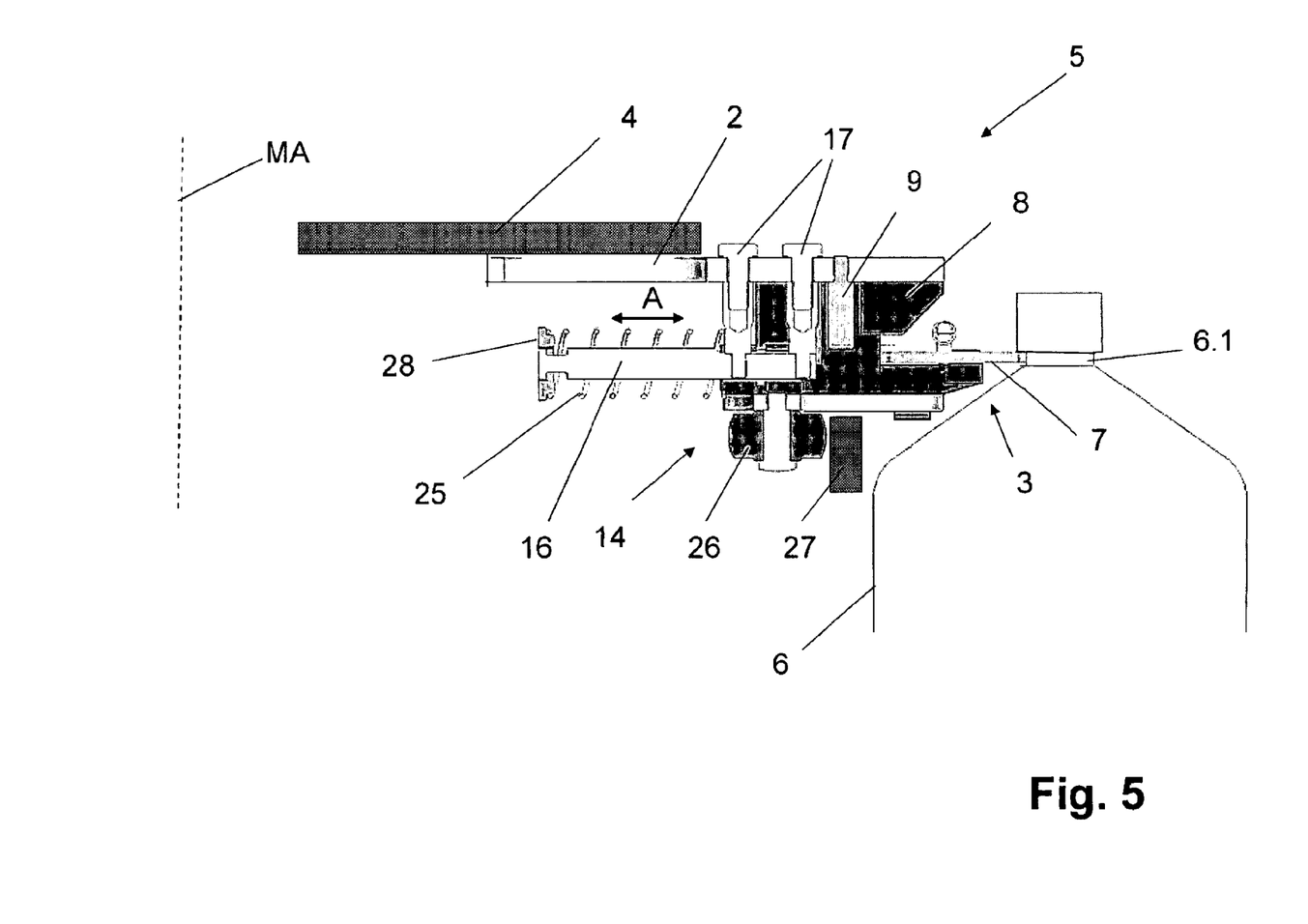
FIG. 5 shows a simplified representation of and partial section through one of the grippers of the gripper arrangement together with a container being held at the gripper.

At their ends furthest from axes GA and radially outward relative to machine axis MA, gripper arms 7 are provided with recesses 11 which together form a container holder 12 that grips respective container 2 in the manner of tongs. In the depicted embodiment, grippers 3 and/or their gripper arms 7 are configured so as to hold container 6 by a container neck 6.1 beneath the container mouth, in one possible embodiment for a use of gripper arrangement 1 with containers 6 having significantly different container diameters, for example having a container diameter ranging from 25 millimeters to 38 millimeters.

For holding or gripping respective container 6, a tension spring 13 acting directly between gripper arms 7 pretensions the two gripper arms 7 of each gripper 3 into a closed position (closed condition) to grip or hold respective container 6 in the manner of a clamp. Respective container 6 can be pushed by its container neck 6.1 sideways or radially into the respective holder 12 or withdrawn again from said holder as gripper arms 6 open under spring tension. Container 6 which is held by gripper 3 is enclosed at its container neck 6.1 by gripper arms 7 over a peripheral range greater than 180 degrees (wrap-round).

One particularity of gripper arrangement 1 is that each gripper 3 exhibits a closing or locking element 14 which in the depicted embodiment is configured as a sliding lock and by which, when respective gripper 3 is holding a container 6, an additional arresting or locking of gripper arms 7 is possible steplessly and irrespective of the diameter of the container neck, thus guaranteeing an improved hold of containers 6 at grippers 3, in one possible embodiment at such transport elements 4, for example rotors or transport star wheels, at which containers 6 are also rotated during transport. Suitability for the transport of filled PET bottles should be mentioned here as one possible embodiment among others.

Grippers 3 or gripper arrangement 1 can also be used in at least one possible embodiment for a transport line comprising or comprising different transport elements, in one possible embodiment transport star wheels, such as:

a gripper arrangement 1 with lock, alternately with purely passively acting grippers, without transfer curves, for ejecting or transferring the containers, an application with a high angular speed and resulting centrifugal forces (high-speed installations) or use for transport star wheels which receive containers from neighboring handling machines such as fillers, labelers or stretch-blow machines.

The locking device for those grippers in which one gripper arm can swivel and the other is rigidly configured, is not shown but can be used similarly.

Each closing or locking element 14 comprises essentially a sliding lock carriage 15 which is produced in one possible embodiment as a plastic molding and is guided displaceably on a guide which is formed in the depicted embodiment by a guide rod 16 (double-ended arrow A). Guide rod 16 is oriented with its axis parallel or essentially parallel to surface sides 2.1 of carrier and mounting plate 2 such that this axis lies in plane ME or more or less in plane ME. Guide rod 16 is also arranged such that it lies nearer to bearing pin 9 with a first end than with a second end which relative to the axis of bearing pin 9 lies diametrically opposite the end of gripper arms 7 that forms holder 12. When gripper arrangement 1 is in the assembled condition therefore, the second end of guide rod 16 is nearer to machine axis MA than the first end of guide rod 16. In the depicted embodiment, guide rod 16 is held by its first end on carrier and/or mounting plate 2 by two retaining pins 17.

On their outer faces which are facing away from one another, the two gripper arms 7 of each gripper 3 are formed in such a way that the distance exhibited by the outer faces of both gripper arms 7 from one another in an axial direction square to median axis ME, in one possible embodiment also when gripper 3 is holding a container 6, first increases in a section 7.1 starting from the free end of gripper arms 7 and then decreases in a further section, control face 7.2.

In at least one possible embodiment of the present application, the angles of the outside geometry are selected so that when a container 6 is being held a slight widening (radially outward) is obtained such that a locking function is initiated and can act.

A support plate 18 which in the depicted embodiment is produced from metal is attached to the sliding lock carriage 15 of each closing or locking element 14. Sliding lock carriage 15 is itself configured with two arms 19 which are disposed either side of midplane ME and are offset relative to the two gripper arms 7 in an axial direction at right angles to surface side 2.1. Arms 19 are at one end connected to support plate 18 by way of stud bolt 20, or support plate 18 is, as shown in this embodiment, screwed to sliding lock carriage 15 by way of bolt 20. Starting from this end, arms 19 extend towards gripper arms 7 where they are configured with prominences 21 which on their inner faces facing each other form locking faces 21.1 by which locking carriage 15 straddles the two gripper arms 7 of respective gripper 3 on its outside faces 7.1 or on the sections located there, control face 7.2. The arrangement is also selected so that mutually facing locking faces 21.1 that are formed by angled prominences 21 exhibit—in an axial direction at right angles to midplane ME—a distance from one another which is at least slightly less than the maximum distance between sections 7.2 when gripper 3 is holding a container 6 which has a container neck diameter equal to the smallest container neck diameter to be processed.

In the region of angled prominences 21 the two arms 19 are interconnected by a saddle 22 running at right angles to midplane ME, although the saddle may not be necessary and/or desired.

In the depicted example, sections 18.1 of support plate 18 also engage behind each of arms 19 at a prominence 23. At the end adjacent to bolts 20, the two arms 19 are each configured with a radially projecting wing-like section 24 which when gripper arrangement 1 is in its assembled condition, act as an additional guide element to prevent or restrict or minimize sliding lock carriage 15 from twisting against surface side 2.1. The aforesaid bolts 20 can be executed analogously as pins.

A compression spring 25 arranged around guide rod 16 pretensions sliding lock carriage 15 towards the free end of gripper arms 7 in a position which prevents or restricts or minimizes gripper arms 7 from opening.

A cam roller 26 is also mounted on the closing or locking element 14 or on support plate 18 so as to be free to rotate about an axis which when gripper arrangement 1 is in its assembled condition is oriented at right angles to surface side 2.1 and which in the manner described in more detail below interacts with a control cam 27 that does not move with the circulating transport element 4 and/or is static.

The design of sections 7.2 makes possible infinitely variable locking, i.e. a locking both for containers 6 with a small container neck diameter (with sliding lock carriage 15 moved further forward by compression spring 25), and for containers 6 with a large container neck diameter (with sliding lock carriage 15 moved less further forward by compression spring 25). Sliding lock carriage 15 essentially effects a locking of respective gripper 3 against an opening of gripper arms 7 or against a release of respective container 6, whereas the holding or clamping force for holding container 6 in the unlocked condition is generated by tension spring 13.

When in use, gripper arrangement 1 is attached to the underside of transport element 4 in the rotated condition, i.e. with surface side 2.1 of carrier and/or mounting plate 2 facing down.

In at least one possible embodiment of the present application, the device may be independent of the opening angle of gripper arms 7 because it automatically moves radially as far as the respective end position.

Figure 2:
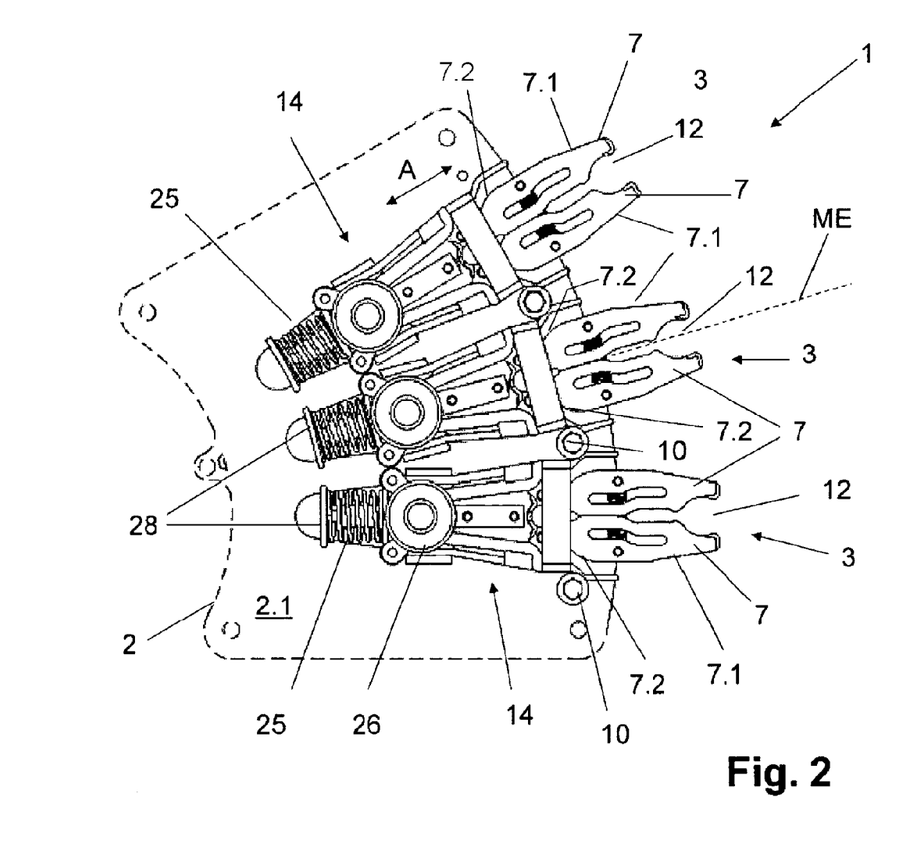

At the place where, as transport element 4 circulates, containers 6 are transferred to or taken from grippers 3, by running its cam roller 26 onto a control cam 27 against the action of compression spring 25, respective closing or locking element 14 or its sliding lock carriage 15 is moved back respectively into its position which does not lock gripper 3 or into its release position in which angled prominences 21 with their locking faces 21.1 release gripper arms 7. The locking position of closing or locking elements 14 (lock position) is shown in FIG. 1 and the non-locking position of the closing or locking elements (release position) is shown in FIG. 2.

In case of damage or wear the closing or locking element 14 can be replaced without difficulty or significant effort, in at least one embodiment by removing back support 28 against which the end of compression spring 25 furthest from sliding lock carriage 15 is supported, and then taking sliding lock carriage 15 and compression spring 25 off guide rod 16. Back support 28 is held on the back end of guide rod 16 for example with a bayonet-type interlock to simplify the assembly, removal or replacement of sliding lock carriage 15.

Independently of the respective specific execution in detail, some possible embodiments of the gripper arrangement 1 according to the possible embodiment can be summarized as follows:

Very much simplified cost-effective construction with high holding and clamping forces for holding containers 6;

the holding and gripping operation is separated from the locking function of grippers 3 by respective closing or locking element 14;

Suitability for containers 6 with very different container neck diameters;

Simplified replacement of faulty closing or locking elements 14;

a design that is open and in one possible embodiment easy to clean as well;

minimal control forces for moving closing or locking element 14 between the locking and non-locking positions, so there is less wear and less noise emission.

In at least one possible embodiment of the gripper arrangement 1 according to the present application essentially guarantees a sure hold of containers 6 at grippers 3, both for empty containers 6 and for full containers 6, for example in the form of bottles such as for example PET bottles or also glass bottles, it being possible for a design configuration that has already been proven in practice to be used for grippers 3.

By an appropriate choice of spring force for tension spring 13 it is possible to achieve a container transfer to grippers 3 and a container removal from grippers 3 which is gentle, i.e. without strong insertion or ejection forces and with minimal wear and minimal noise emission.

The locking action which is achieved with closing or locking element 14 is self-adjusting over the full range of grippers 3, allowing gripper arrangement 1 to be used for very different container neck diameters, for example for container neck diameters ranging from 25 millimeters to 37 millimeters, without any kind of conversion.

Compression spring 25 achieves a pretensioning for closing or locking element 14 and this also results in the play being eliminated between closing or locking elements 14 and gripper arms 7.

Closing or locking elements 14 can also contribute to a certain increase in the holding or clamping force of grippers 3. The additional holding or clamping force generated by compression spring 25 is essentially constant over the whole range of container diameters that is to be processed. The spring force generated by compression spring 25 may decrease as the closing or locking element 14 travels towards the free end of gripper arms 7, but the lever arm by which locking faces 21.1 act on the gripper arms increases at the same time.

Because of the special geometry the closing or locking element 14 has a self-restricting action allowing also for the friction between locking faces 21.1 and gripper arms 7, with the result that an unintended or unwanted opening of grippers 7 is not possible when locking element 14 is in the lock position.

The central position of the container 6 (staggered) is important for rinsers and fillers as well as for safe transfer between transport star wheels. This too is essentially ensured or promoted by respective closing or locking element 14, since sliding lock carriage 15 is guided and oriented on guide rod 16 precisely or essentially precisely or generally radially to machine axis MA of circulating transport element 4.

The respective gripper 3 is located where control cam 27 is not present, in the locked condition. Simple, short control cams 27 are possible as a result, contributing in turn to a cost-effective and easy-to-clean design for a container handling machine or container transport element.

Should sliding lock carriage 15 break under overload, the entire closing or locking element 14 is replaced without the need or desire for tools.

Gripper arrangement 1 can be used to realize a small pitch circle of up to 720 millimeters with a small pitch 30 PI. The geometry with which respective container 6 or its container neck 6.1 is enclosed by gripper 3 is adapted and/or selected as a function of the type and/or weight of containers 6. Thus in the case of containers 6 in the form of PET bottles for example, a large wrap-round with grippers 3 is a possible as a result of which a neck ring that is usually configured on the container 6 concerned beneath the container mouth can be thinner and/or narrower in line with the current trend in container design. A greatest possible wrap-round of containers 6 with grippers 3 may be important however when gripper arrangement 1 is used on a transport element or transport star wheel between a filling machine and a capping machine.

The present application has been described hereinbefore by reference to one embodiment. It goes without saying that numerous variations as well as modifications are possible without departing from the concept underlying the present application.

It has been hitherto assumed that closing or locking element 14 is pretensioned in the lock position by a compression spring 25 and locking faces 21.1 interact with sections 7.2 for this purpose. It is of course equally possible for closing or locking element 14 to be configured in such a way that its locking faces 21.1 interact with sections 7.1 of gripper arms 7, in which closing or locking element 14 is moved into its locking position in the opposite direction, in one possible embodiment in the sense of an increase in the distance between locking faces 21.1 and the free ends of gripper arms 7 which form holder 12. Then instead of compression spring 25, a tension spring for example is provided in this case.

In another possible embodiment, the gripper or container-handling arrangement 1 includes the gripper 3 that has two gripper arms 7. A biasing device, such as the tension spring 13 or other suitable biasing device, biases the gripper arms 7 together to hold a portion of a container therebetween, such as a neck portion of a container. The locking element 14 can be moved between a lock position, in which the locking element 14 locks the gripper arms 7 in place to prevent release of a container, and a release position, in which the locking element 14 does not engage the gripper arms 7 to permit release of a container. The locking element 14 comprises at least one locking face 21.1 designed to contact a corresponding one of the contact surfaces 7.2 upon the locking element 14 being in the lock position.

The container handling arrangement 1, in at least one possible embodiment, can also include a rotary support 4, such as a carousel or rotary disc of a container handling machine, such as a transfer starwheel, a container filling machine, or a container capping/closing machine. A plurality of the grippers 3 are located on and about the periphery of the rotary support 4. The rotary support 4 is designed to be rotated to rotatably transport containers held by the grippers 3.

In another possible embodiment, each of the gripper arms 7 includes a curved grip portion designed to grip a portion of a neck of a container. The curved grip portions are at the end of the gripper arms 7. These ends of the gripper arms 7 are disposed a distance apart from one another that is smaller than the diameter of the neck of a container to be handled, such that the neck of the container is forced between the ends during insertion and removal. In other words, when the ends of the gripper arms 7 are moved together as much as is possible, the space between the ends of the gripper arms 7 should be smaller than the smallest neck diameter of any container to be handled. Otherwise the curved grip portions would not be close enough together to grip the neck portion. The biasing device is designed to continuously produce a bias force on the gripper arms 7, which bias force is designed to be overcome to permit the gripper arms 7 to be moved away from one another during insertion and removal of the neck of a container. The gripper arms 7, upon a container not being held by the gripper arms 7, are designed to be moved toward one another such that the curved grip portions define a holding pocket that corresponds to a minimum neck size of any container to be handled. The gripper arms 7 are designed to be moved further apart from one another by a distance directly proportional to the difference between the neck size of a container to be handled and the minimum neck size, to permit handling of containers having different-sized necks. In other words, when the container neck is inserted into or removed from the gripper arms 7, the container neck will force the gripper arms 7 to move or spread further apart, which movement is permitted by the biasing device.

Each of the gripper arms 7 may also include a contact surface that is angled or curved. When the gripper arms 7 are moved further apart during insertion or removal of a container, the distance between the contact surfaces changes. Since containers can only be released from the gripper arms 7 by moving the gripper arms 7 further apart, the locking element 14 is used to prevent such movement of the gripper arms 7. The locking element 14 can be designed to extend across both gripper arms 7 when the locking element 14 is in the lock position. The gripper arms 7 are held between the locking faces 21.1 to prevent movement of the gripper arms 7 further apart from one another, which thereby prevents unintentional release of a container held by the gripper arms 7. For example, if the locking element 14 is not used, it is possible that forces exerted on a container held by the gripper arms 7, such as centrifugal force during rotary movement of the container, could be sufficient to overcome the gripping or biasing force applied to the gripper arms by the biasing device. As a result, the container could be unintentionally released or dislodged from the gripper arms 7, which would be undesirable. The locking element 14 is used to prevent such unintentional release by preventing movement of the gripper arms 7 further apart from one another.

The container-handling arrangement also includes an additional biasing device, such as spring 25, which is designed to continuously bias the locking element 14 toward the ends of the gripper arms 7. The additional biasing device is designed to move the locking element 14 out of the release position a first distance along the contact surfaces 7.2 into a first lock position when the gripper arms 7 are gripping a container neck of a first diameter. The additional biasing device is also designed to move the locking element 14 out of the release position a second, lesser, distance along the contact surfaces 7.2 into a second lock position when the gripper arms 7 are gripping a container neck of a second, greater, diameter. The additional biasing device is designed to move the locking element 14 out of the release position a plurality of different distances to a plurality of lock positions depending on the size of a container neck to be gripped. In other words, the gripper arms 7, when gripping a container neck that is larger in diameter than the smallest container neck, the gripper arms 7 will be moved or spread further apart. When the gripper arms 7 are moved further apart, the distance between the contact surfaces 7.2 increases. The contact surfaces 7.2 can form somewhat of a V-shape which widens and increases in its angular size as the diameter of the container neck is increased. Accordingly, the lock element 14, which has a fixed width, cannot slide as far along the container surfaces 7.2, and thus stops at a lock position after traveling a shorter distance than would be done for a smaller-diameter container neck. However, this design provides a distinct technical advantage in that no matter what the diameter of the container neck, the locking element 14 can always be moved into a locking position. Rather than being restricted to only one locking position, the locking element can be moved into a plurality of locking positions depending on the container neck size. Further, this adjustment is done automatically due to the design of the locking element 14 and additional biasing device, without the need for measurements of the neck size and corresponding calculations. Therefore, not only does this design permit handling of different types of containers with different neck sizes, it also compensates for manufacturing tolerances between containers that are nominally the same but vary slightly in their dimensions from container to container.

One feature or aspect of an embodiment is believed at the time of the filing of this patent application to possibly reside broadly in a gripper arrangement comprising at least one gripper 3 having at least two gripper arms 7 which can be moved relative to each other and which are tensioned in a closed position by at least one closing device, in one possible embodiment a closing spring 13, for clamping bottles or similar containers 6 by partially engaging around the respective container 6 in a container region 6.1, for example a container neck, wherein the gripper arrangement comprises a closing or locking element 14 which can be controlled to move back and forth linearly in radial direction between a locked position which locks the gripper arms 7 in a closed position and a release position which releases the gripper arms 7 for an opening of the gripper 3, and wherein the closing or locking element 14 exhibits at least one locking face 21.1 and wherein the at least one locking face 21.1 acts on the local control faces 7.2, at least in a position of a gripper arm 7 in which the gripper 3 is locked.

Another feature or aspect of an embodiment is believed at the time of the filing of this patent application to possibly reside broadly in the gripper arrangement wherein the closing or locking element 14 exhibits a locking face 21.1 interacting with a control face 7.2 of at least one gripper arm 7, and wherein—at least at the container 6 that is held in the gripper 3—the control face 7.2 and/or locking face 21.1 are inclined relative to an axis of movement A in which the closing or locking element 14 is moved between the lock position and the release position while forming an acute angle of inclination of less than 45 degrees, in one possible embodiment of less than 20 degrees.

Yet another feature or aspect of an embodiment is believed at the time of the filing of this patent application to possibly reside broadly in the gripper arrangement wherein, when the inclined control face 7.2 is formed on at least one gripper arm 7, the angle of inclination between the control face 7.2 and the axis of movement A of the closing or locking element 14 opens out in the direction of a stroke of the closing or locking element 14 which releases the gripper 3.

Still another feature or aspect of an embodiment is believed at the time of the filing of this patent application to possibly reside broadly in the gripper arrangement wherein the closing or locking element 14 exhibits at least two locking faces 21.1 and with these locking faces 21.1 straddles the control faces 7.2, at least in the position of gripper arms 7 in which gripper 3 is locked.

A further feature or aspect of an embodiment is believed at the time of the filing of this patent application to possibly reside broadly in the gripper arrangement wherein the control faces 7.2 are disposed either side of a gripper plane MA and configured for example on outside edges of gripper arms 7, and wherein the closing or locking element 14 can move in an axial direction in the gripper plane MA between the lock position and the release position.

Another feature or aspect of an embodiment is believed at the time of the filing of this patent application to possibly reside broadly in the gripper arrangement wherein the gripper plane is a midplane or plane of symmetry ME to which the gripper 3 is mirror-symmetrically configured as regards the gripper arms 7.

Yet another feature or aspect of an embodiment is believed at the time of the filing of this patent application to possibly reside broadly in the gripper arrangement wherein the closing or locking element 14 is a sliding lock 14 which can move on a guide 16 between the lock position and the release position.

Still another feature or aspect of an embodiment is believed at the time of the filing of this patent application to possibly reside broadly in the gripper arrangement wherein the gripper arrangement comprises a controller for the controlled movement of the closing or locking element 14 between the lock position and the release position.

A further feature or aspect of an embodiment is believed at the time of the filing of this patent application to possibly reside broadly in the gripper arrangement wherein the closing or locking element 14 is pretensioned in its lock position by at least one spring element 25, for example by a compression spring.

Another feature or aspect of an embodiment is believed at the time of the filing of this patent application to possibly reside broadly in the gripper arrangement wherein the controller exhibits at least one cam roller 26 that is provided on the closing or locking element 14 and interacting with a control cam 27.

Yet another feature or aspect of an embodiment is believed at the time of the filing of this patent application to possibly reside broadly in the gripper arrangement wherein the gripper arrangement comprises in one possible embodiment a plate-like carrier and/or mounting element 2 on which are provided at least one gripper 3 with associated closing or locking element 14, in one possible embodiment at least two grippers 3 each with an independent closing or locking element 14.

One feature or aspect of an embodiment is believed at the time of the filing of this patent application to possibly reside broadly in a container transport element which can be driven to rotate, having a plurality of grippers for holding bottles or similar containers 6, wherein the grippers 3 are part of at least one gripper arrangement 1 that is configured according to the present application.

One feature or aspect of an embodiment is believed at the time of the filing of this patent application to possibly reside broadly in a container-handling arrangement comprising: a gripper comprising two gripper arms; a biasing device configured to bias said gripper arms together to hold a portion of a container therebetween; and a locking element configured to be moved between a lock position, in which said locking element locks said gripper arms in place to prevent release of a container, and a release position, in which said locking element does not engage said gripper arms to permit release of a container.

Another feature or aspect of an embodiment is believed at the time of the filing of this patent application to possibly reside broadly in the container-handling arrangement, wherein: each of said gripper arms is movable with respect to one another; said biasing device comprises a spring; said gripper arms are configured to grip a neck portion of a container; each of said gripper arms comprises a contact surface; and said locking element comprises at least one locking face configured to contact a corresponding one of said contact surfaces upon said locking element being in said lock position.

Yet another feature or aspect of an embodiment is believed at the time of the filing of this patent application to possibly reside broadly in the container-handling arrangement, wherein: said locking element is configured to be moved linearly along an line of movement; at least one of: said contact surface and said at least one locking face, is disposed at an angle with respect to said line of movement; and said angle is one of (A) and (B): (A) less than 45°; and (B) less than 20°.

Still another feature or aspect of an embodiment is believed at the time of the filing of this patent application to possibly reside broadly in the container-handling arrangement, wherein said contact surface is disposed at an angle with respect to said line of movement, which angle opens in a direction facing away from the direction of movement of said locking element from said lock position to said release position.

A further feature or aspect of an embodiment is believed at the time of the filing of this patent application to possibly reside broadly in the container-handling arrangement, wherein: said locking element comprises at least one additional locking face; and said locking element is configured to extend across both gripper arms upon said locking element being in said lock position, such that said gripper arms are held between said locking faces.

Another feature or aspect of an embodiment is believed at the time of the filing of this patent application to possibly reside broadly in the container-handling arrangement, wherein: said control faces comprise outside edges or sides of said gripper arms; and said gripper arms are arranged symmetrically in the form of a pair of pincers.

Yet another feature or aspect of an embodiment is believed at the time of the filing of this patent application to possibly reside broadly in the container-handling arrangement, wherein: the container handling arrangement comprises a guide; and said locking element is slidable on said guide between said lock position and said release position.

Still another feature or aspect of an embodiment is believed at the time of the filing of this patent application to possibly reside broadly in the container-handling arrangement, wherein the container handling arrangement comprises a controller configured to control movement of said locking element between said lock position and said release position.

A further feature or aspect of an embodiment is believed at the time of the filing of this patent application to possibly reside broadly in the container-handling arrangement, wherein: said locking element is biased toward the ends of said gripper arms by at least one spring element or compression spring.

Another feature or aspect of an embodiment is believed at the time of the filing of this patent application to possibly reside broadly in the container-handling arrangement, wherein: said controller comprises at least one cam roller connected to said locking element and configured to interact with a control cam.

Yet another feature or aspect of an embodiment is believed at the time of the filing of this patent application to possibly reside broadly in the container-handling arrangement, wherein: the container handling arrangement comprises a plate-like support element on which said gripper is supported, which plate-like support element is configured to support more than one gripper.

Still another feature or aspect of an embodiment is believed at the time of the filing of this patent application to possibly reside broadly in the container-handling arrangement, wherein: the container handling arrangement comprises a plurality of additional grippers and a rotary support; said grippers are disposed on and about the periphery of said rotary support; and said rotary support is configured to be rotated to rotatably transport containers held by said grippers.

Another feature or aspect of an embodiment is believed at the time of the filing of this patent application to possibly reside broadly in the container-handling arrangement, wherein: each of said gripper arms is movable with respect to one another; each of said gripper arms comprises a grip portion configured to grip a neck portion of a container that comprises a bottle; and said biasing device comprises a spring connected to each of said gripper arms adjacent said grip portion.

Yet another feature or aspect of an embodiment is believed at the time of the filing of this patent application to possibly reside broadly in the container-handling arrangement, wherein: each of said gripper arms comprises a contact surface; and said locking element comprises at least one locking face configured to contact a corresponding one of said contact surfaces upon said locking element being in said lock position.

Still another feature or aspect of an embodiment is believed at the time of the filing of this patent application to possibly reside broadly in the container-handling arrangement, wherein: said locking element is configured to be moved linearly along a line of movement; and said contact surface is disposed at an acute angle with respect to said line of movement.

A further feature or aspect of an embodiment is believed at the time of the filing of this patent application to possibly reside broadly in the container-handling arrangement, wherein: said rotary support comprises an axis of rotation; and said line of movement extends essentially radially from said axis of rotation, such that said locking element is configured to be moved toward and away from said axis of rotation.

Another feature or aspect of an embodiment is believed at the time of the filing of this patent application to possibly reside broadly in the container-handling arrangement, wherein: each of said gripper arms is movable with respect to one another; each of said gripper arms comprises a curved grip portion configured to grip a portion of a neck of a container; each of said curved grip portions comprises an end of its gripper arms; said ends of said gripper arms are disposed a distance apart from one another that is smaller than the diameter of the neck of a container to be handled, such that the neck of the container is forced between said ends during insertion and removal; and said biasing device is configured to continuously produce a bias force on said gripper arms, which bias force is configured to be overcome to permit said gripper arms to be moved away from one another during insertion and removal of the neck of a container.

Yet another feature or aspect of an embodiment is believed at the time of the filing of this patent application to possibly reside broadly in the container-handling arrangement, wherein: each of said gripper arms comprises an angled or curved contact surface disposed on the outsides thereof; said locking element comprises two locking faces configured to contact a corresponding one of said contact surfaces upon said locking element being in said lock position; said gripper arms are configured and disposed, upon a container not being held by said gripper arms, to be moved toward one another such that said curved grip portions define a holding pocket that corresponds to a minimum neck size of any container to be handled; and said gripper arms are configured to be moved further apart from one another by a distance directly proportional to the difference between the neck size of a container to be handled and the minimum neck size, to permit handling of containers having different-sized necks, such that the distance between said contact surfaces changes.

Still another feature or aspect of an embodiment is believed at the time of the filing of this patent application to possibly reside broadly in the container-handling arrangement, wherein: said locking element is configured to extend across both gripper arms upon said locking element being in said lock position, such that said gripper arms are held between said locking faces to prevent movement of said gripper arms further apart from one another, and thus prevent unintentional release of a container held by said gripper arms; the container-handling arrangement comprises an additional biasing device configured to continuously bias said locking element toward the ends of said gripper arms; and said additional biasing device is configured to move said locking element out of said release position a first distance along said contact surfaces into a first lock position upon said gripper arms gripping a container neck of a first diameter, and is configured to move said locking element out of said release position a second, lesser, distance along said contact surfaces into a second lock position upon said gripper arms gripping a container neck of a second, greater, diameter.

A further feature or aspect of an embodiment is believed at the time of the filing of this patent application to possibly reside broadly in the container-handling arrangement, wherein: the container-handling arrangement comprises an additional biasing device configured to continuously bias said locking element toward the ends of said gripper arms; said additional biasing device is configured to move said locking element out of said release position a first distance into a first lock position upon said gripper arms gripping a container neck of a first diameter, and is configured to move said locking element out of said release position a second, lesser, distance along said contact surfaces into a second lock position upon said gripper arms gripping a container neck of a second, greater, diameter; and said additional biasing device is configured to move said locking element out of said release position a plurality of different distances to a plurality of lock positions depending on the size of a container neck to be gripped.

The present application relates to a gripper arrangement comprising at least one gripper with at least two gripper arms which can be moved in relation to each other and which are tensioned in a closed position by at least one closing spring device, for clamping bottles or similar containers by at least partially gripping the respective container 6 in a certain area, for example on the neck of the container.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the German Office Action dated May 14, 2013, and/or cited elsewhere, as well as the German Office Action document itself, are hereby incorporated by reference as if set forth in their entirety herein except for the exceptions indicated herein, as follows: DE 23 40 796, having the title "BEHAELTER-TRANSPORTVORRICHTUNG", published on May 22, 1974; and EP 1 854 589, having the title "VIAL CONVEYANCE DEVICE AND ARM FOR THE SAME," published on Nov. 14, 2007.

All of the patents, patent applications, patent publications, and other documents, except for the exceptions indicated herein, which were cited in the International Search Report dated Nov. 12, 2013, and/or cited elsewhere, as well as the International Search Report document itself, are hereby incorporated by reference as if set forth in their entirety herein except for the exceptions indicated herein, as follows: EP 1 854 589, having the title "VIAL CONVEYANCE DEVICE AND ARM FOR THE SAME", published on Nov. 14, 2007; US 2012/031043, having the title "MEDICAMENT DISPENSING MACHINE", published on Feb. 9, 2012; DE 29712066, having the title "Greifvorrichtung für Flaschen", published on Oct. 23, 1997; EP 0 577 569, having the title "Pliers with movable jaws for gripping bottles or the like for mounting preferably on an automatic rinsing-sterilizing machine", published on Jan. 5, 1994; and WO 2009/135596, having the title "DEVICE FOR FIXING A BOTTLE NECK IN A SAW-TOOTH SPIDER ELEMENT OF A BOTTLE FILLING INSTALLATION", published on Nov. 12, 2009.

The corresponding foreign and international patent publication applications, namely, Federal Republic of Germany Patent Application No. 10 2012 011 367.6, filed on Jun. 11, 2012, having inventor Andreas FAHLDIECK, and DE-OS 10 2012 011 367.6 and DE-PS 10 2012 011 367.6, and International Application No. PCT/2013/001534, filed on May 24, 2013, having WIPO Publication No. WO2013/185880 and inventor Andreas FAHLDIECK, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/2013/001534 and German Patent Application 10 2012 011 367.6, is solely for the purposes of providing a basis of correction of any wording in the pages of the present application, which may have been mistranslated or misinterpreted by the translator, and to provide additional information relating to technical features of one or more embodiments, which information may not be completely disclosed in the wording in the pages of this application.

Statements made in the original foreign patent applications PCT/2013/001534 and DE 10 2012 011 367.6 from which this patent application claims priority which do not have to do with the correction of the translation in this patent application are not to be included in this patent application in the incorporation by reference.

Any statements about admissions of prior art in the original foreign patent applications PCT/2013/001534 and DE 10 2012 011 367.6 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL LIST OF NOMENCLATURE

1 Gripper arrangement
2 Carrier and mounting plate
2.1 Surface side of the carrier and/or mounting plate
3 Gripper
4 Transport elements
5 Container handling device
6 Container
6.1 Container neck
7 Gripper arm
7.1, 7.2 Control face; gripper arms section
8 Bearing element
8.1 Wing
9 Bearing pin
10 Pin
11 Recess
12 Holder
13 Tension spring
14 Closing or locking element
15 Sliding lock carriage
16 Guide rod
17 Retaining pin
18 Support plate
18.1 Section
19 Arm
20 Bolt/stud
21 Angled prominence
21.1 Locking face
22 Saddle
23 Prominence
24 Wing-like section
25 Compression spring
26 Cam roller
27 Control cam
28 Back support
A Movement of closing or locking element 14
GA Gripper arm swivel axis
MA Machine axis
ME Midplane or plane of symmetry of grippers 3

What is claimed is:

1. A container-handling arrangement comprising:
a gripper comprising two gripper arms;
a biasing device configured to bias said gripper arms together to hold a portion of a container therebetween;
a locking element configured to be moved between a lock position, in which said locking element locks said gripper arms in place to prevent release of the container, and a release position, in which said locking element does not engage said gripper arms to permit release of the container;
each of said gripper arms comprises a contact surface; and
said locking element comprises at least one locking face configured to contact a corresponding one of said contact surfaces upon said locking element being in said lock position.

2. The container-handling arrangement according to claim 1, wherein:
each of said gripper arms is movable with respect to one another;
said biasing device comprises a spring; and
said gripper arms are configured to grip a neck portion of the container.

3. The container-handling arrangement according to claim 2, wherein:
said locking element is configured to be moved linearly along a line of movement;
at least one of: said contact surface and said at least one locking face, is disposed at an angle with respect to said line of movement; and
said angle is one of (A) and (B):
(A) less than 45E; and
(B) less than 20E.

4. The container-handling arrangement according to claim 3, wherein said contact surface is disposed at an angle with respect to said line of movement, which angle opens in a direction facing away from the direction of movement of said locking element from said lock position to said release position.

5. The container-handling arrangement according to claim 4, wherein:
said locking element comprises at least one additional locking face; and
said locking element is configured to extend across both gripper arms upon said locking element being in said lock position, such that said gripper arms are held between said locking faces.

6. The container-handling arrangement according to claim 5, wherein:
said contact surfaces comprise outside edges or sides of said gripper arms; and
said gripper arms are arranged symmetrically in the form of a pair of pincers.

7. The container-handling arrangement according to claim 6, wherein:
the container handling arrangement comprises a guide; and
said locking element is slidable on said guide between said lock position and said release position.

8. The container-handling arrangement according to claim 7, wherein the container handling arrangement comprises a controller configured to control movement of said locking element between said lock position and said release position.

9. The container-handling arrangement according to claim 8, wherein said locking element is biased toward the ends of said gripper arms by at least one spring element or compression spring.

10. The container-handling arrangement according to claim 9, wherein said controller comprises at least one cam roller connected to said locking element and configured to interact with a control cam.

11. The container-handling arrangement according to claim 10, wherein the container handling arrangement comprises a plate-like support element on which said gripper is supported, which plate-like support element is configured to support more than one gripper.

12. The container-handling arrangement according to claim 1, wherein:
the container handling arrangement comprises a plurality of additional grippers and a rotary support;
said grippers are disposed on and about the periphery of said rotary support; and
said rotary support is configured to be rotated to rotatably transport containers held by said grippers.

13. The container-handling arrangement according to claim 12, wherein:
each of said gripper arms is movable with respect to one another;
each of said gripper arms comprises a grip portion configured to grip a neck portion of the container that comprises a bottle; and
said biasing device comprises a spring connected to each of said gripper arms adjacent said grip portion.

14. The container-handling arrangement according to claim 13, wherein:
said locking element is configured to be moved linearly along a line of movement; and
said contact surface is disposed at an acute angle with respect to said line of movement.

15. The container-handling arrangement according to claim 14, wherein:
said rotary support comprises an axis of rotation; and
said line of movement extends essentially radially from said axis of rotation, such that said locking element is configured to be moved toward and away from said axis of rotation.

16. The container-handling arrangement according to claim 1, wherein:
each of said gripper arms is movable with respect to one another;
each of said gripper arms comprises a curved grip portion configured to grip a portion of a neck of the container;
each of said curved grip portions comprises an end of its gripper arms;
said ends of said gripper arms are disposed a distance apart from one another that is smaller than the diameter of the neck of the container to be handled, such that the neck of the container is forced between said ends during insertion and removal; and
said biasing device is configured to continuously produce a bias force on said gripper arms, which bias force is configured to be overcome to permit said gripper arms to be moved away from one another during insertion and removal of the neck of the container.

17. The container-handling arrangement according to claim 16, wherein:
each of said contact surfaces is angled or curved and is disposed on the outsides of its gripper arm;
said at least one locking face comprises two locking faces configured to contact a corresponding one of said contact surfaces upon said locking element being in said lock position;
said gripper arms are configured and disposed, upon the container not being held by said gripper arms, to be moved toward one another such that said curved grip portions define a holding pocket that corresponds to a minimum neck size of any container to be handled; and
said gripper arms are configured to be moved further apart from one another by a distance directly proportional to the difference between the neck size of the container to be handled and the minimum neck size, to permit handling of containers having different-sized necks, such that the distance between said contact surfaces changes.

18. The container-handling arrangement according to claim 17 wherein:
said locking element is configured to extend across both gripper arms upon said locking element being in said lock position, such that said gripper arms are held between said locking faces to prevent movement of said gripper arms further apart from one another, and thus prevent unintentional release of the container held by said gripper arms;
the container-handling arrangement comprises an additional biasing device configured to continuously bias said locking element toward the ends of said gripper arms; and
said additional biasing device is configured to move said locking element out of said release position a first distance along said contact surfaces into a first lock position upon said gripper arms gripping the container neck of a first diameter, and is configured to move said locking element out of said release position a second, lesser, distance along said contact surfaces into a second lock position upon said gripper arms gripping the container neck of a second, greater, diameter.

19. A container-handling arrangement comprising:
a gripper comprising two gripper arms;
a biasing device configured to bias said gripper arms together to hold a portion of a container therebetween;
a locking element configured to be moved between a lock position, in which said locking element locks said gripper arms in place to prevent release of the container, and a release position, in which said locking element does not engage said gripper arms to permit release of the container;
the container-handling arrangement comprises an additional biasing device configured to continuously bias said locking element toward the ends of said gripper arms;
said additional biasing device is configured to move said locking element out of said release position a first distance into a first lock position upon said gripper arms gripping the container neck of a first diameter, and is configured to move said locking element out of said release position a second, lesser, distance along said contact surfaces into a second lock position upon said gripper arms gripping the container neck of a second, greater, diameter; and
said additional biasing device is configured to move said locking element out of said release position a plurality of different distances to a plurality of lock positions depending on the size of the container neck to be gripped.

20. A container-handling arrangement comprising:

a gripper comprising two gripper arms;

a biasing device configured to bias said gripper arms together to hold a portion of a container therebetween;

a locking element configured to be moved between a lock position, in which said locking element locks said gripper arms in place to prevent release of the container, and a release position, in which said locking element does not engage said gripper arms to permit release of the container; and said biasing device being configured to continuously and directly bias said gripper arms together during movement of said locking element between said lock position and said release position.

* * * * *